(12) United States Patent
Lee et al.

(10) Patent No.: US 11,219,079 B2
(45) Date of Patent: Jan. 4, 2022

(54) METHOD AND DEVICE FOR TRANSMITTING SCG FAILURE INFORMATION MESSAGE IN WIRELESS COMMUNICATION SYSTEM

(71) Applicant: LG ELECTRONICS INC., Seoul (KR)

(72) Inventors: Youngdae Lee, Seoul (KR); Hanul Lee, Seoul (KR); Sangwon Kim, Seoul (KR)

(73) Assignee: LG ELECTRONICS INC., Seoul (KR)

(\*) Notice: Subject to any disclaimer, the term of this patent is extended or adjusted under 35 U.S.C. 154(b) by 88 days.

(21) Appl. No.: 16/499,151

(22) PCT Filed: Mar. 26, 2018

(86) PCT No.: PCT/KR2018/003521
§ 371 (c)(1),
(2) Date: Sep. 27, 2019

(87) PCT Pub. No.: WO2018/182254
PCT Pub. Date: Oct. 4, 2018

(65) Prior Publication Data
US 2020/0053810 A1 Feb. 13, 2020

Related U.S. Application Data

(60) Provisional application No. 62/476,898, filed on Mar. 27, 2017.

(51) Int. Cl.
*H04W 76/18* (2018.01)
*H04W 76/15* (2018.01)
(Continued)

(52) U.S. Cl.
CPC .......... *H04W 76/18* (2018.02); *H04L 1/1874* (2013.01); *H04W 76/15* (2018.02); *H04W 84/20* (2013.01)

(58) Field of Classification Search
CPC .......... H04W 72/0493; H04W 72/042; H04W 80/08; H04W 76/19; H04W 24/04
See application file for complete search history.

(56) References Cited

U.S. PATENT DOCUMENTS

2016/0044743 A1 2/2016 Xu et al.
2018/0270699 A1* 9/2018 Babaei .............. H04W 72/1284
(Continued)

FOREIGN PATENT DOCUMENTS

KR 20150051124 5/2015
WO 2015141406 9/2015
(Continued)

OTHER PUBLICATIONS

European Patent Office Application Serial No. 18775130.0, Search Report dated Jan. 27, 2020, 7 pages.
(Continued)

*Primary Examiner* — Iqbal Zaidi
(74) *Attorney, Agent, or Firm* — Lee Hong Degerman Kang Waimey

(57) ABSTRACT

Provided is a method and device for selectively transmitting a secondary cell group (SCG) failure information message to one of a master node (MN) and a secondary node (SN) in a wireless communication system. A user equipment (UE) detects a failure related to an SCG, and selectively transmits an SCG failure information message to one of an MN and an SN according to a reason for the failure related to the SCG. For example, if the reason for the failure related to the SCG is associated with the size of a hybrid automatic repeat
(Continued)

request (HARQ) buffer, the UE ma transmit the SCG failure information message to the SN.

14 Claims, 15 Drawing Sheets

(51) Int. Cl.
  *H04L 1/18* (2006.01)
  *H04W 84/20* (2009.01)

(56) References Cited

U.S. PATENT DOCUMENTS

| | | | |
|---|---|---|---|
| 2018/0367288 A1* | 12/2018 | Vrzic | H04W 36/0069 |
| 2019/0098640 A1* | 3/2019 | Holakouei | H04W 28/0236 |
| 2019/0289510 A1* | 9/2019 | Rugeland | H04W 36/0069 |

FOREIGN PATENT DOCUMENTS

| | | |
|---|---|---|
| WO | 2016/021821 | 2/2016 |
| WO | 2016/064334 | 4/2016 |

OTHER PUBLICATIONS

LG Electronics, "Handling of receiving invalid SCG configuration in EN-DC", 3GPP TSG RAN WG2 Meeting #97bis, R2-1702947, Apr. 2017, 3 pages.
PCT International Application No. PCT/KR2018/003521, International Search Report dated Jun. 25, 2018, 2 pages.
Intel Corporation et al., "Addition of Extended EARFCNs in SCGFailureInformation Message," 3GPP TSG RAN WG2 Meeting #97, R2-1 702050, Athens, Greece, Feb. 20, 2017, 6 pages.
Section 5.6.13 of 3GPP TS 36.331 V14.1.0 (Dec. 2016), Valbonne, France, 4 pages.

* cited by examiner

METHOD AND DEVICE FOR TRANSMITTING SCG FAILURE INFORMATION MESSAGE IN WIRELESS COMMUNICATION SYSTEM

CROSS-REFERENCE TO RELATED APPLICATIONS

This application is the National Stage filing under 35 U.S.C. 371 of International Application No. PCT/KR2018/003521, filed on Mar. 26, 2018, which claims the benefit of U.S. Provisional Application No. 62/476,898, filed on Mar. 27, 2017, the contents of which are all hereby incorporated by reference herein in their entirety.

BACKGROUND OF THE INVENTION

Field of the Invention

The present invention relates to wireless communication and, more particularly, to a method and device for selectively transmitting an SCG failure information message to either a master node (MN) or a secondary node (SN).

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. The NR system may be called another name, e.g. new radio access technology (new RAT). 3GPP has to identify and develop the technology components needed for successfully standardizing the NR timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

According to new architecture for the 5G core network and 5G radio access network (RAN) including NR, a user equipment (UE) may receive a better service in view of throughput and UE experience. Also, tight interworking of LTE/NR is under discussion. Due to tight interworking of LTE/NR, interworking between an eNodeB (eNB) and a new RAN node (for example, gNB) is allowed, and as a result, throughput of a UE may be improved. An eNB of the LTE and gNB of the NR may manage resources individually. More specifically, dual/multiple connections for improving throughput of a UE according to the tight interworking of LTE/NR may be used, and signaling for UE mobility may be simplified.

SUMMARY OF THE INVENTION

In connecting via dual connectivity to LTE/NR, each network node of the LTE/NR may coordinate UE capabilities so that the UE capabilities in the LTE and NR do not exceed the total UE capability. However, since the LTE and NR are different systems, it may not be successful to coordinate UE capabilities between LTE and NR. If a failure occurs with respect to a secondary cell group (SCG), a UE may transmit an SCG failure information message, while, in the conventional LTE system, the SCG failure information message is transmitted only to a master node (MeNB).

In an aspect, a method for transmitting a secondary cell group (SCG) failure information message by a user equipment (UE) in a wireless communication system is provided. The method includes detecting a failure related to a SCG, and transmitting the SCG failure information message to either a master node (MN) or a secondary node (SN) according to a cause of the failure related to the SCG.

In another aspect, a user equipment (UE) in a wireless communication system is provided. The UE includes a memory, a transceiver, and a processor connected to the memory and the transceiver. The processor is configured to detect a failure related to a SCG, and control the transceiver to transmit the SCG failure information message to either a master node (MN) or a secondary node (SN) according to a cause of the failure related to the SCG.

An SCG failure information message can be transmitted efficiently.

DESCRIPTION OF EXEMPLARY EMBODIMENTS

Hereinafter, in the present invention, a wireless communication system based on a 3rd generation partnership project (3GPP) or institute of electrical and electronics engineers (IEEE) is mainly described. However, the present invention is not limited thereto, and the present invention may be applied to other wireless communication systems having the same characteristics to be described hereinafter.

Figure 1:
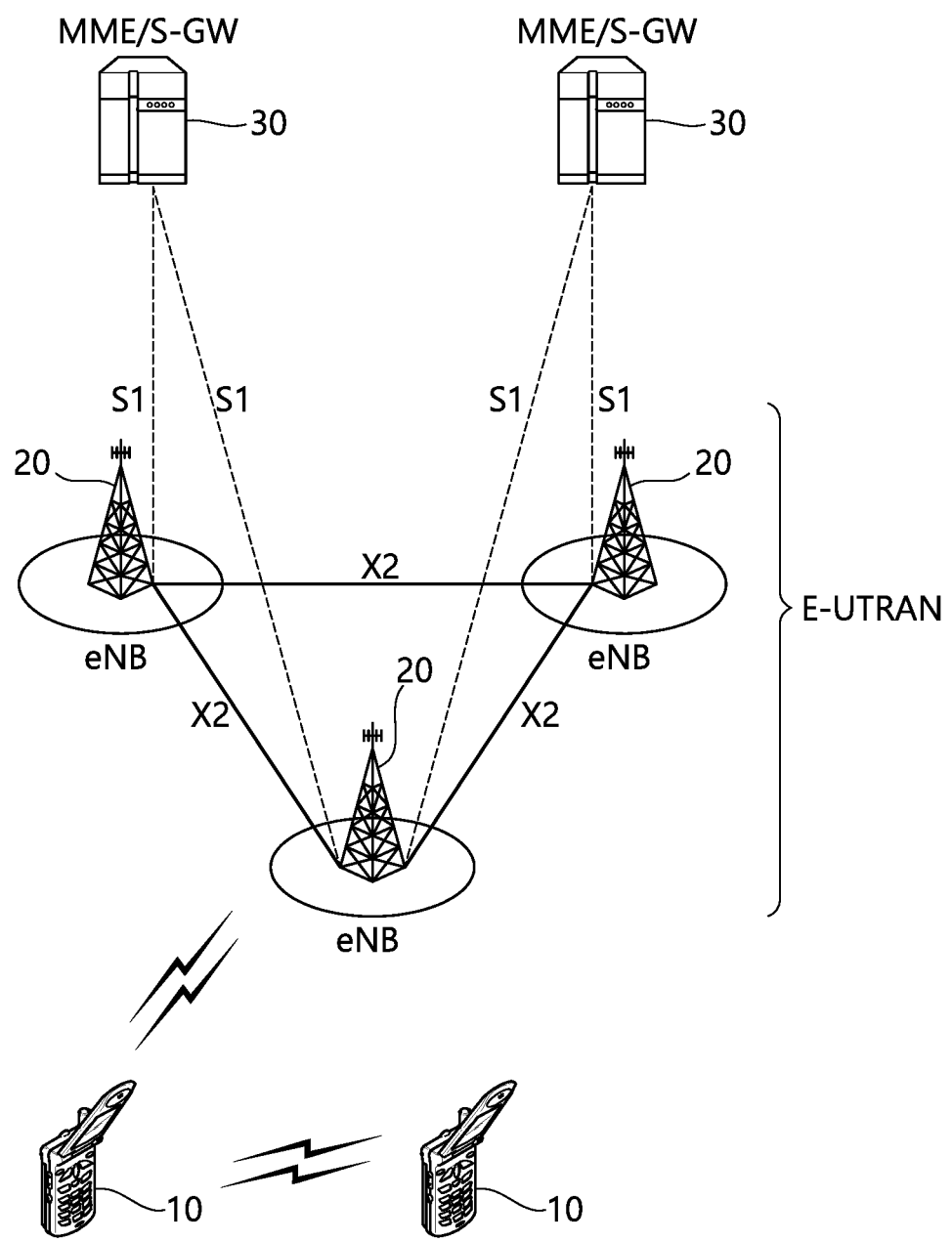
FIG. 1 shows 3GPP LTE system architecture.

FIG. 1 shows 3GPP LTE system architecture. Referring to FIG. 1, the 3GPP long-term evolution (LTE) system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
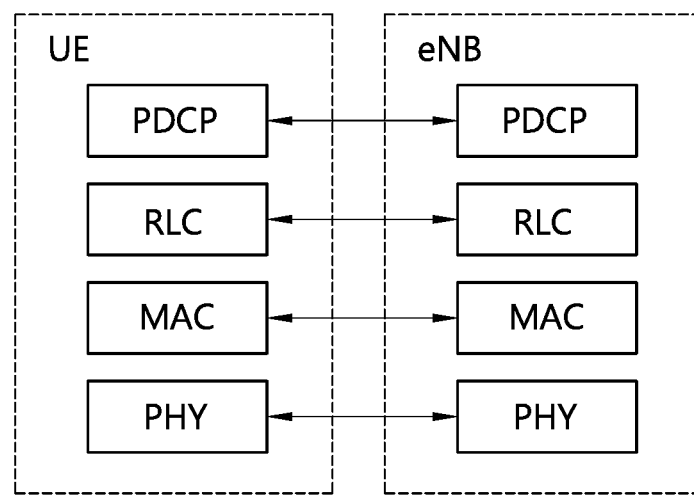
FIG. 2 shows a block diagram of a user plane protocol stack of an LTE system.
Figure 3:
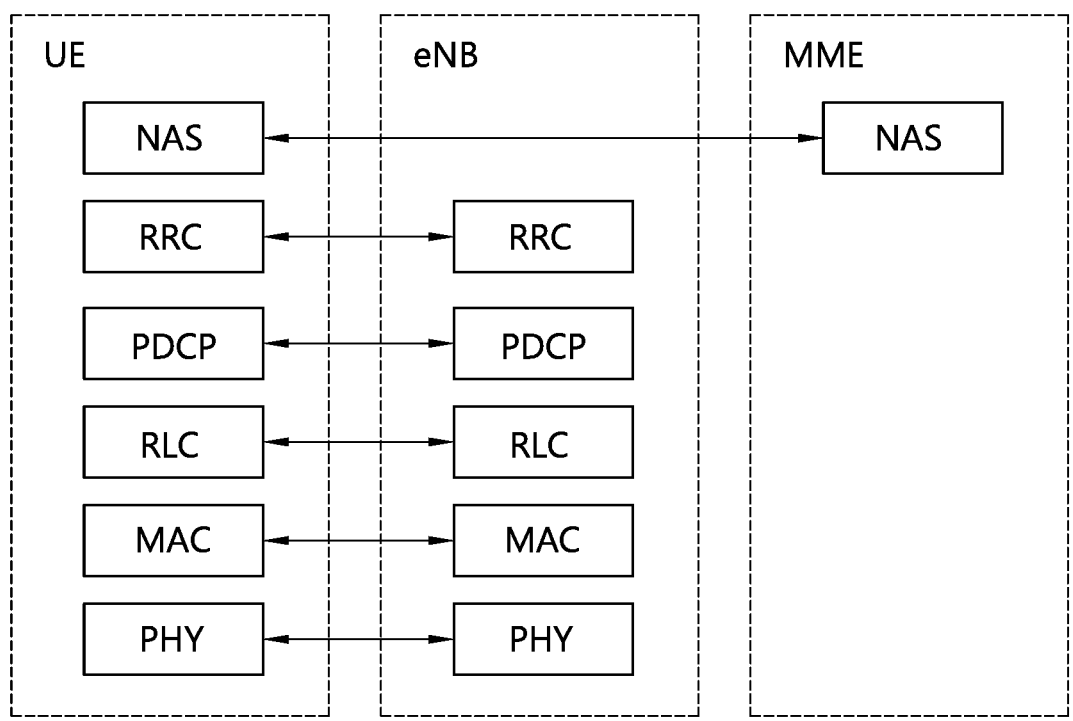
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

5G system is a 3GPP system consisting of 5G access network (AN), 5G core network (CN) and UE. 5G access network is an access network comprising a next generation radio access network (NG-RAN) and/or non-3GPP access network connecting to a 5G core network. NG-RAN is a radio access network that supports one or more of the following options with the common characteristics that it connects to 5G core network:

1) Standalone new radio (NR).
2) NR is the anchor with E-UTRA extensions.
3) Standalone E-UTRA.
4) E-UTRA is the anchor with NR extensions.

Figure 4:
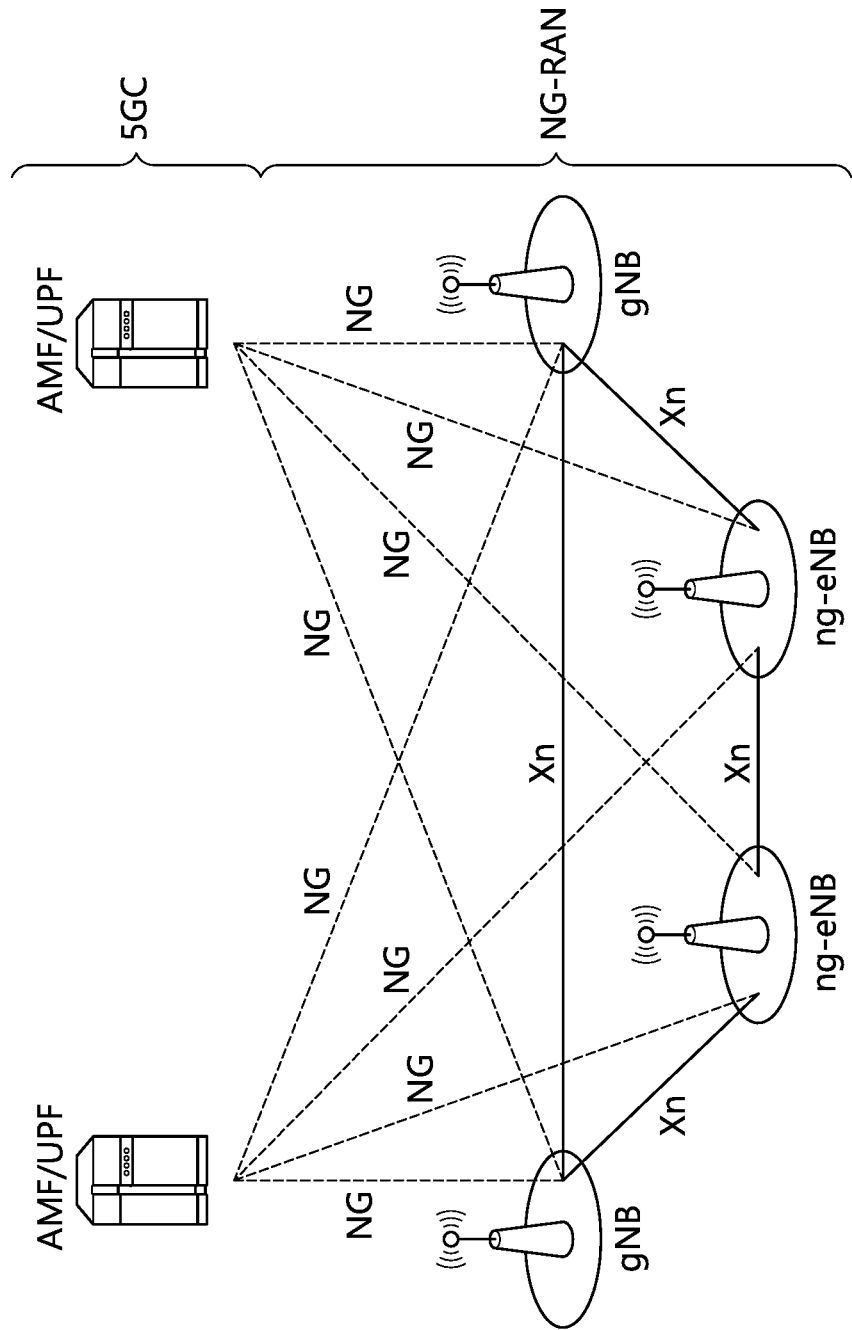
FIG. 4 shows an NG-RAN architecture.

FIG. 4 shows an NG-RAN architecture. Referring to FIG. 4, the NG-RAN includes at least one NG-RAN node. The NG-RAN node includes at least one gNB and/or at least one ng-eNB. The gNB provides NR user plane and control plane protocol terminations towards the UE. The ng-eNB provides E-UTRA user plane and control plane protocol terminations towards the UE. The gNBs and ng-eNBs are interconnected with each other by means of the Xn interface. The gNBs and ng-eNBs are also connected by means of the NG interfaces to the 5G CN. More specifically, the gNBs and ng-eNBs are connected to the access and mobility management function (AMF) by means of the NG-C interface and to the user plane function (UPF) by means of the NG-U interface.

The gNB and ng-eNB host the following functions:
Functions for radio resource management: Radio bearer control, radio admission control, connection mobility control, dynamic allocation of resources to UEs in both uplink and downlink (scheduling);
Internet protocol (IP) header compression, encryption and integrity protection of data;
Selection of an AMF at UE attachment when no routing to an AMF can be determined from the information provided by the UE;
Routing of user plane data towards UPF(s);

Routing of control plane information towards AMF;
Connection setup and release;
Scheduling and transmission of paging messages;
Scheduling and transmission of system broadcast information (originated from the AMF or operations & maintenance (O&M));
Measurement and measurement reporting configuration for mobility and scheduling;
Transport level packet marking in the uplink;
Session management;
Support of network slicing;
QoS flow management and mapping to data radio bearers;
Support of UEs in RRC INACTIVE state;
Distribution function for non-assess stratum (NAS) messages;
Radio access network sharing;
Dual connectivity;
Tight interworking between NR and E-UTRA.

The AMF hosts the following main functions:
NAS signaling termination;
NAS signaling security;
AS security control;
Inter CN node signaling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing;
Session management function (SMF) selection.

The UPF hosts the following main functions:
Anchor point for Intra-/Inter-radio access technology (RAT) mobility (when applicable);
External protocol data unit (PDU) session point of interconnect to data network;
Packet routing & forwarding;
Packet inspection and user plane part of policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink traffic verification (service data flow (SDF) to QoS flow mapping);
Downlink packet buffering and downlink data notification triggering.

The SMF hosts the following main functions:
Session management;
UE IP address allocation and management;
Selection and control of UP function;
Configures traffic steering at UPF to route traffic to proper destination;
Control part of policy enforcement and QoS;
Downlink data notification.

In what follows, multi-RAT dual connectivity will be described. NG-RAN supports multi-RAT dual connectivity configured so that a UE in the RRC_CONNECTED state with multiple RX/TX may use radio resources provided by two separate schedulers. Multi-RAT dual connectivity is generalization of the E-UTRA dual connectivity. Two separate schedulers are located at two different NG-RAN nodes connected to each other through a non-ideal backhaul. One of the two different NG-RAN nodes performs the role of a master node (MN), and the other one performs the role of a secondary node (SN). In other words, one scheduler is located at the MN while the other scheduler is located at the SN. The two different NG-RAN nodes provide either the E-UTRA connectivity (when the NG-RAN node is an ng-eNB) or NR connectivity (when the NG-RAN node is a gNB). The ng-eNB is a node that provides the NR user plane and control plane protocol termination toward a UE and operates as an SN in the E-UTRAN-NR dual connectivity (EN-DC). The gNB is a node that provides the E-UTRA user plane and control plane protocol termination toward a UE and is connected to 5G CN through an NG interface. The MN and SN are connected to each other through a network interface, and at least the MN is connected to the core network. Although multi-RAT dual connectivity in the present specification has been designed based on a non-ideal backhaul between different nodes, the multi-RAT dual connectivity may also be used for an ideal backhaul.

Figure 5:
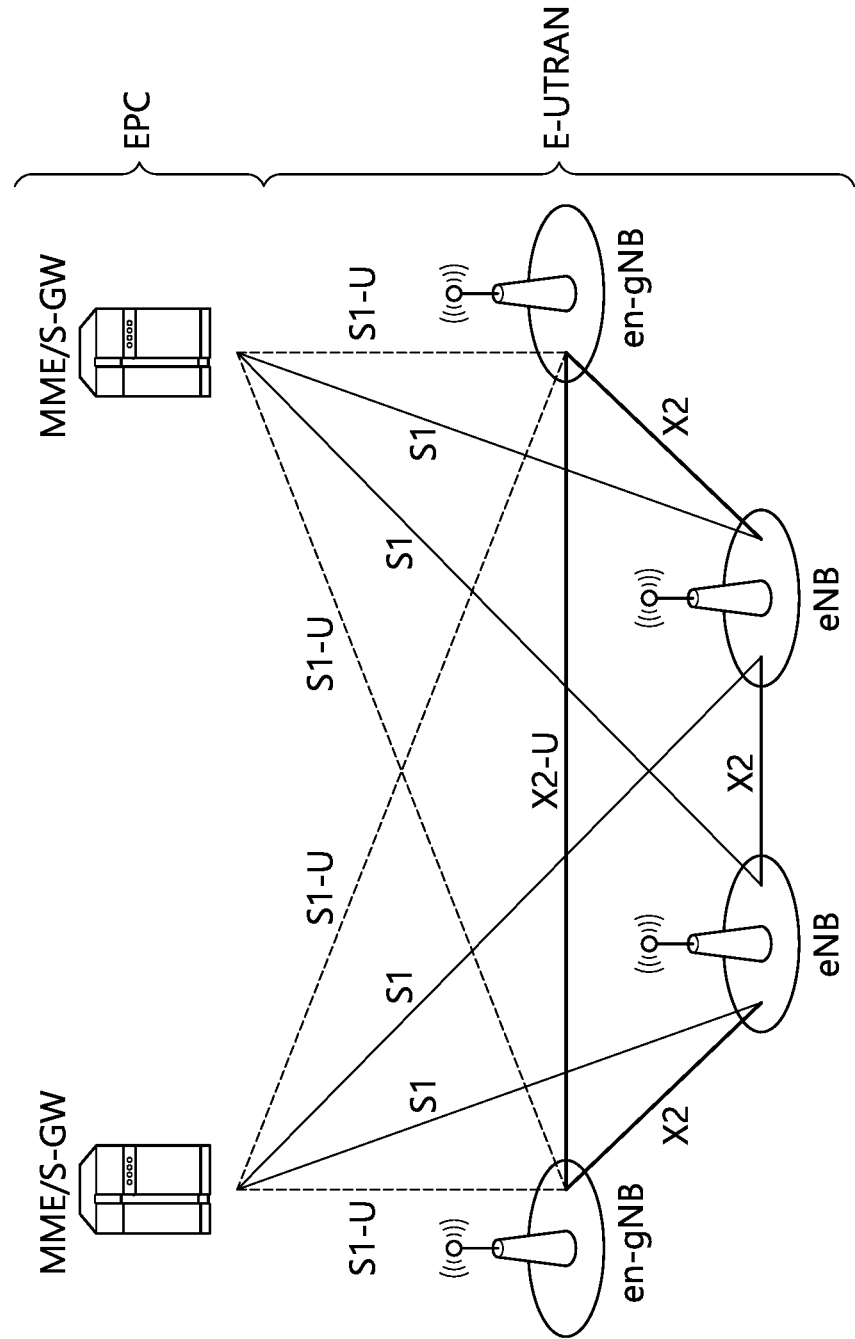
FIG. 5 shows EN-DC architecture.

FIG. 5 shows EN-DC architecture. The E-UTRAN supports multi-RAT dual connectivity through EN-DC, where a UE is connected to one eNB operating as an MN and one en-gNB operating as an SN. An eNB is connected to EPC through S1 interface and connected to en-gNB through X2 interface. The en-gNB may be connected to the EPC through S1-U interface and connected to a different en-gNB through X2-U interface.

The 5G CN also supports multi-RAT dual connectivity. An NG-RAN supports NG-RAN E-UTRA-NR dual connectivity (NGEN-DC), where a UE is connected to one ng-eNB operating as an MN and one gNB operating as an SN. The ng-eNB is connected to the 5G CN, and the gNB is connected to the ng-eNB through Xn interface. Also, the NG-RAN supports NR-E-UTRA dual connectivity (NE-DC), where a UE is connected to one gNB operating as an MN and one ng-eNB operating as an SN. The gNB is connected to the 5G CN, and ng-eNB is connected to the gNB through Xn interface.

The following three bearer types may be considered for dual connectivity of LTE/NR.
Split bearer through master cell group (MCG): This is similar to the option 3C of the dual connectivity architecture of the conventional LTE
Secondary cell group (SCG) bearer: This is similar to the option 1A of the dual connectivity architecture of the conventional LTE.
Split bearer through SCG: Bearer split occurs at the secondary node.

Figure 6:
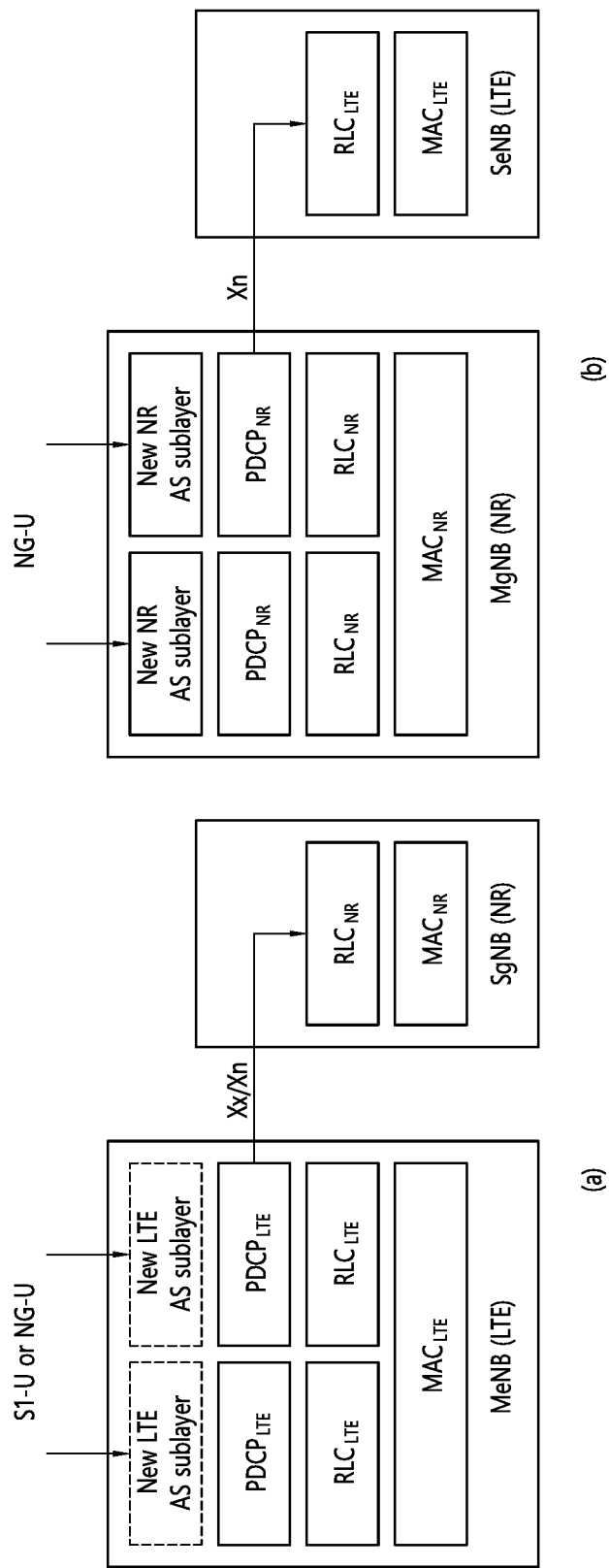
FIG. 6 shows a split bearer through MCG.

FIG. 6 shows a split bearer through MCG. In FIG. 6-(a), the master node is eNB (namely master eNB (MeNB)), and the secondary node is gNB (namely, SgNB). In FIG. 6-(a), MeNB/SgNB is connected to the core network through S1-U or NG-U. The MCG bearer is constructed in the MeNB side via a new LTE AS sublayer. A split bearer through MCG passes through the new LTE AS sublayer in the MeNB side, branches in the PDCP layer, and is delivered to the RLC layer of SgNB through Xx/Xn interface. In FIG. 6-(b), the master node is gNB (namely MgNB), and secondary node is eNB (namely secondary eNB (SeNB)). In FIG. 6-(b), MgNB/SeNB is connected to the core network through NG-U. The MCG bearer is constructed in the MgNB side via a new NR AS sublayer. A split bearer through MCG passes through the new NR AS sublayer in the MgNB side, branches in the PDCP layer, and is delivered to the RLC layer of SeNB through Xn interface.

Figure 7:
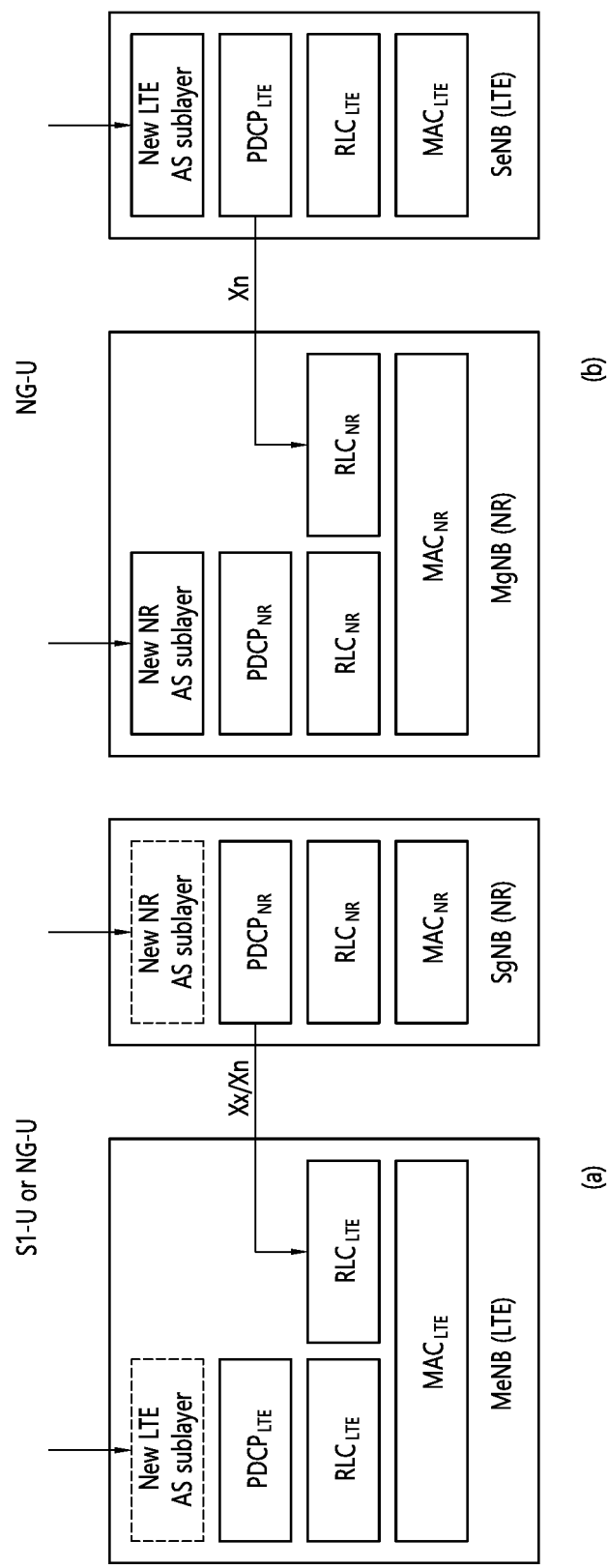
FIG. 7 shows a split bearer through SCG.

FIG. 7 shows a split bearer through SCG. In FIG. 7-(a), the master node is eNB (namely MeNB), and the secondary node is gNB (namely, SgNB). In FIG. 7-(a), MeNB/SgNB is connected to the core network through S1-U or NG-U. The MCG bearer is constructed in the MeNB side via a new LTE AS sublayer. A split bearer through SCG passes through the new NR AS sublayer in the SgNB side, branches in the PDCP layer, and is delivered to the RLC layer of MeNB through Xx/Xn interface. In FIG. 7-(b), the master node is gNB (namely MgNB), and secondary node is eNB (namely SeNB). In FIG. 7-(b), MgNB/SeNB is connected to the core network through NG-U. The MCG bearer is constructed in the MgNB side via a new NR AS sublayer. A split bearer through SCG passes through the new LTE AS sublayer in the SeNB side, branches in the PDCP layer, and is delivered to the RLC layer of MgNB through Xn interface.

The three bearer types mentioned above may be supported irrespective of a connected core network except for the split bearer through SCG when the master node is gNB. Related to reconfiguration of the bearer type, reconfiguration between an SCG bearer and MCG bearer, reconfiguration of the SCG bearer between two different secondary nodes, and reconfiguration between MCG bearer and MCG split bearer may be supported.

SCG reconfiguration is described. SCG reconfiguration is performed through the RRC connection reconfiguration procedure. The purpose of the RRC connection reconfiguration procedure is to modify the RRC connection. For example, modification of the RRC connection may include establishment/modification/release of an RB, execution of handover, configuration/modification/release of measurement, and addition/modification/release of a secondary cell (SCell). As part of the RRC connection reconfiguration procedure, NAS-specific information may be delivered from the E-UTRAN to a UE.

When an RRC connection reconfiguration (RRCConnectionReconfiguation) message does not include mobilityContrlInfo and a UE is able to comply with a configuration included in the RRC connection reconfiguration message, the UE performs the following operations with respect to the SCG reconfiguration. If the RRC connection reconfiguration message includes scg-Configuration, or a current UE configuration includes one or more split data RB (DRB), and the RRC connection reconfiguration message includes radioResourceConfigDedicated including drb-ToAddModLIst, the UE performs SCG reconfiguration. Or, if the RRC connection reconfiguration message includes mobilityContrlInfo, and the UE is able to comply with the configuration included in the RRC connection reconfiguration message, the UE performs the following operation with respect to the SCG reconfiguration. If the RRC connection reconfiguration message includes scg-Configuration, or a current UE configuration includes one or more split DRB, and the RRC connection reconfiguration message includes radioResourceConfigDedicated including drb-ToAddModLIst, the UE performs SCG reconfiguration.

If the UE is unable to comply with the configuration included in the RRC connection reconfiguration message (or part thereof), for example, if unable to comply with scg-Configuration, the UE continues to use a previous configuration used before receiving the RRC connection reconfiguration message. If security has not been activated yet, the UE determines the cause of release as 'other' and performs actions after leaving the RRC_CONNECTED. Otherwise, if security has been activated, the UE starts an RRC connection re-establishment procedure and terminates the RRC connection reconfiguration procedure accordingly.

A procedure of transmitting an SCG failure information message is described. Section 5.6.13 of 3GPP TS 36.331 V14.1.0 can be referred. The purpose of this procedure is to inform E-UTRAN about an SCG failure the UE has experienced, i.e., SCG radio link failure, SCG change failure.

Figure 8:
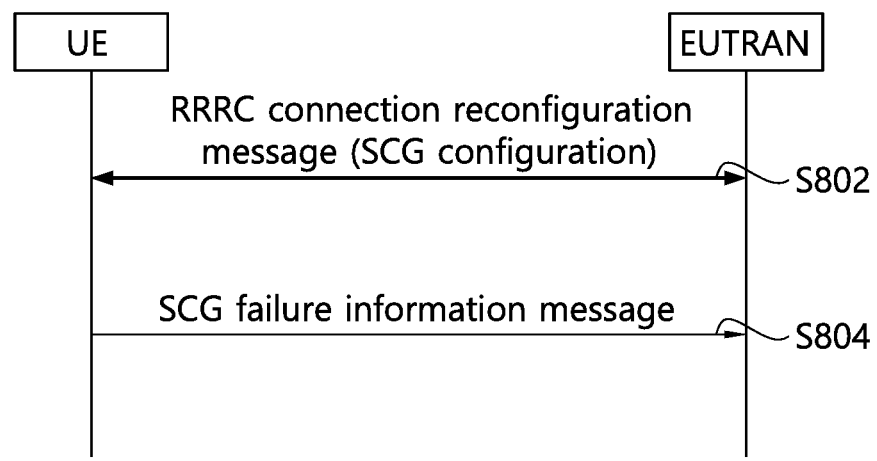
FIG. 8 shows a procedure of transmitting an SCG failure information message.

FIG. 8 shows a procedure of transmitting an SCG failure information message. Referring to FIG. 8, in step S802, the UE and the E-UTRAN perform an RRC connection reconfiguration procedure. The RRC connection reconfiguration procedure includes SCG reconfiguration. In step S804, the UE transmits an SCG failure information (SCGFailInformation) message to the E-UTRAN. The UE initiates a procedure for reporting SCG failure when the SCG transmission is not suspended and one of the following conditions is met. The UE initiates the procedure to report SCG failures when SCG transmission is not suspended and when one of the following conditions is met.

1> upon detecting radio link failure for the SCG; or
1> upon SCG change failure; or
1> upon stopping UL transmission towards the primary SCell (PSCell) due to exceeding the maximum UL transmission timing difference when powerControlMode is configured to 1.

Upon initiating the procedure, the UE shall:
1> suspend all SCG DRBs and suspend SCG transmission for split DRBs;
1> reset SCG-MAC;
1> stop T307;
1> initiate transmission of the SCGFailureInformation message;

The UE shall set the contents of the SCGFailureInformation message as follows.
1> if the UE initiates transmission of the SCGFailureInformation message to provide SCG radio link failure information:
2> include failureType and set it to the trigger for detecting SCG radio link failure;
1> else if the UE initiates transmission of the SCGFailureInformation message to provide SCG change failure information:
2> include failureType and set it to scg-ChangeFailure;
1> else if the UE initiates transmission of the SCGFailureInformation message due to exceeding maximum UL transmission timing difference:
2> include failureType and set it to maxUL-TimingDiff;
1> set the measResultServFreqList to include for each SCG cell that is configured, if any, within measResultSCell the quantities of the concerned SCell, if available according to performance requirements;
1> for each SCG serving frequency included in measResultServFreqList, include within measResultBestNeighCell the physCellId and the quantities of the best non-serving cell, based on reference signal received power (RSRP), on the concerned serving frequency;
1> set the measResultNeighCells to include the best measured cells on non-serving E-UTRA frequencies, ordered such that the best cell is listed first, and based on measurements collected up to the moment the UE detected the failure, and set its fields as follows;
2> if the UE was configured to perform measurements for one or more non-serving EUTRA frequencies and measurement results are available, include the measResultListEUTRA;
2> for each neighbor cell included, include the optional fields that are available;

The UE shall submit the SCGFailureInformation message to lower layers for transmission.

As described above, dual connectivity between different RATs such as EN-DC between the LTE and NR is supported.

In a dual connectivity scenario between RATs, MN may be eNB of the LTE, and SN may be gNB of NR. In the dual connectivity scenario between RATs, each network node may have UE capabilities, and it is necessary to coordinate UE capabilities so that the UE capabilities in the LTE and NR do not exceed the total UE capability. However, since the LTE and NR are different systems, each network node may not understand signaling transmitted from other system with respect to the UE capability. Therefore, coordination of UE capabilities between the LTE and NR may not be successful. At this time, if the UE receives only the SCG configuration that is beyond its capabilities, the UE performs an RRC connection re-establishment procedure in the conventional technologies. And this operation leads to service suspension. Also, in the case of SCG failure, the UE transmits an SCG failure information message, where, in the conventional LTE system, the SCG failure information message is transmitted only to the master eNB (MeNB). This is so because only the MeNB has the RRC layer.

To solve the problem above, the present invention proposes a method for selectively transmitting the SCG failure information message either to MN or SN.

1. Embodiment 1

According to one embodiment of the present invention, if a UE receives an SCG configuration which cannot be complied by the UE, the UE selectively transmits an SCG failure information message either to MN or SN according to a failure type. The failure type may be configured as a cause of the SCG configuration failure (for example, scg-ConfigurationFailure) within the SCG failure information message.

Figure 9:
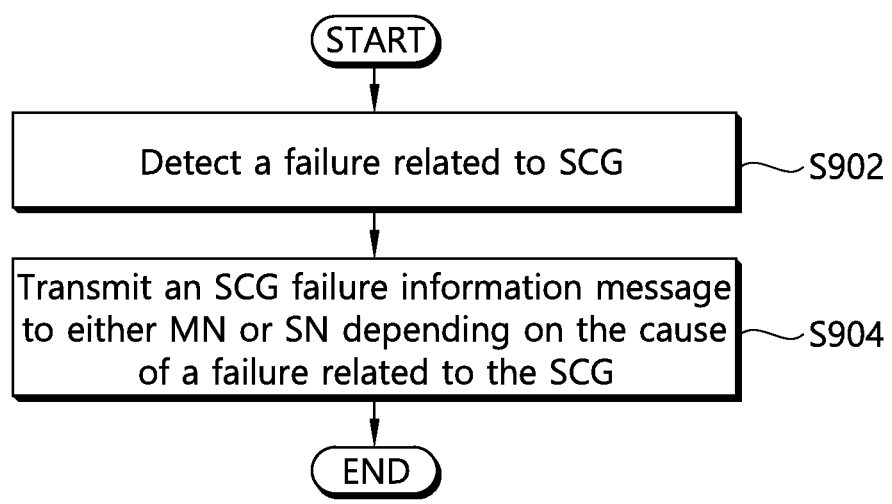
FIG. 9 shows an example of a method for transmitting an SCG failure information message according to embodiment 1 of the present invention.

FIG. 9 shows an example of a method for transmitting an SCG failure information message according to embodiment 1 of the present invention.

In step S902, the UE detects a failure related to the SCG. The failure related to the SCG may be detected as the UE receives an SCG configuration which cannot be complied by the UE. The SCG configuration which cannot be complied by the UE may be received from at least one of the MN or SN. Also, the SCG configuration which cannot be complied by the UE may be received via any one of an SCG SRB, SCG SRB or split SRB. In other words, the SCG configuration which cannot be complied by the UE may be received from MN through an MCG SRB or MCG transmission of a split SRB, or from SN through an SCG SRB or SCG transmission of a split SRB. The MN may be either eNB of the LTE or gNB of NR, and the SN may be either eNB of the LTE or gNB of NR.

In step S904, the UE transmits the SCG failure information message to either of the MN and SN according on the cause of a failure related to the SCG. If the cause of a failure related to the SCG is associated with the HARQ buffer size, the SCG failure information message may be transmitted to the SN. If the cause of a failure related to the SCG is not associated with the HARQ buffer size, the SCG failure information message may be transmitted to the MN. The SCG failure information message may include a cause of a failure related to the SCG. The SCG failure information message may include the SCG configuration preferred by the UE. Also, the UE may suspend all SCG DRBs and SCG transmission for split DRBs except SCG SRB.

Figure 10:
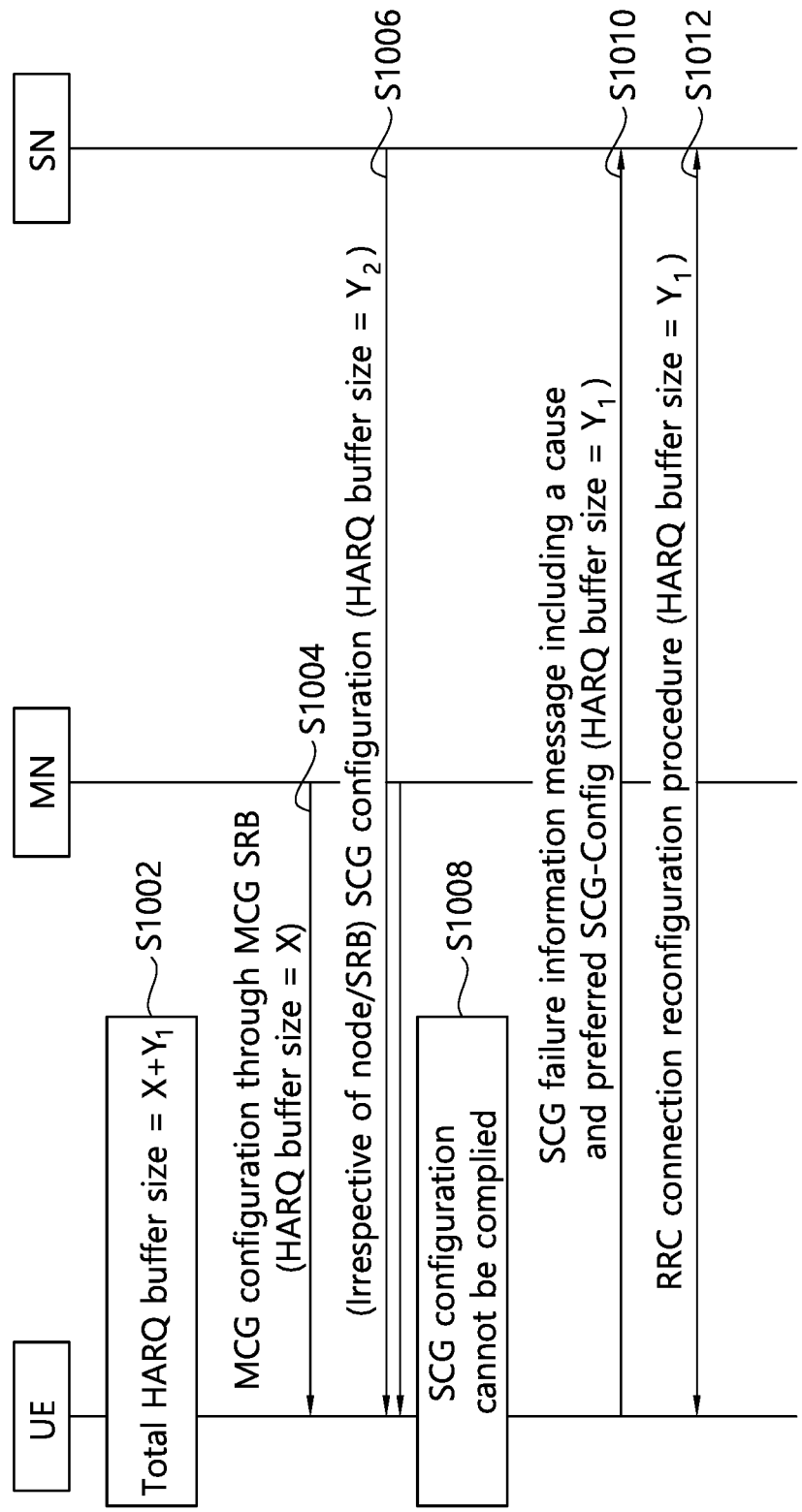
FIG. 10 shows another example of a method for transmitting an SCG failure information message according to embodiment 1 of the present invention.

FIG. 10 shows another example of a method for transmitting an SCG failure information message according to embodiment 1 of the present invention.

In step S1002, the UE sets the total size of the HARQ buffer to $X+Y_1$. In step S1004, the UE receives an MCG configuration from the MN through the MCG SRB. The MCG configuration includes information indicating that the HARQ buffer size for the MN is X.

In step S1006, the UE receives an SCG configuration. The SCG configuration may be received from at least one of the MN or SN. The SCG configuration may be received through at least one of an MCG SRB, SCG SRB, or split SRB. In other words, the SCG configuration may be received only from the MN through the MCG SRB or MCG transmission of the split SRB, or only from the SN through the SCG SRB or SCG transmission of the split SRB, or from both of the MN and SN through the split SRB. The SCG configuration includes information indicating that the size of the HARQ buffer for the SN is $Y_2$, which is larger than $Y_1$.

In step S1008, the UE cannot comply with the SCG configuration. Therefore, the UE detects a failure related to the SCG. The UE may suspend all SCG DRBs and SCG transmission for split DRBs except SCG SRB.

In step S1010, the UE transmits the SCG failure information message to the SN through the SCG SRB. In the present embodiment, since the reason why the UE cannot comply with the SCG configuration is related with the HARQ buffer size, the SCG failure information message may be transmitted to the SN through the SCG SRB. The SCG failure information message may include a cause of the failure related to the SCG (namely the HARQ buffer size) and/or preferred SCG configuration (namely, the HARQ buffer size for $SN=Y_1$).

In step S1012, the UE and SN perform SCG reconfiguration through an RRC connection reconfiguration procedure. The SCG reconfiguration may include information indicating that the HARQ buffer size for the SN is $Y_1$.

According to embodiment 1 of the present invention, the conventional procedure for transmitting an SCG failure information message may be modified as follows. A UE initiates the procedure to report SCG failures when SCG transmission is not suspended and when one of the following conditions is met.

1> upon detecting radio link failure for the SCG; or
1> upon SCG change failure; or
1> upon stopping UL transmission towards the PSCell due to exceeding the maximum UL transmission timing difference when powerControlMode is configured to 1.
1> upon receiving SCG configuration over SCG SRB which UE cannot comply with Upon initiating the procedure, the UE shall:
1> if the UE receives the not complied SCG configuration:
2> suspend all SCG DRBs and suspend SCG transmission for split DRBs except SCG SRB;
1> else:
2> reset SCG-MAC;
2> stop T307;
2> initiate transmission of the SCGFailureInformation message.

The UE shall set the contents of the SCGFailureInformation message as follows.

1> if the UE initiates transmission of the SCGFailureInformation message over MCG SRB to provide SCG radio link failure information:
2> include failureType and set it to the trigger for detecting SCG radio link failure;

1> else if the UE initiates transmission of the SCGFailureInformation message over SCG SRB or split SRB to provide preferred SCG configuration (e.g., HARQ buffer size):
  2> include failureType and set it to SCG configuration Failure;
1> else if the UE initiates transmission of the SCGFailureInformation message to provide SCG change failure information:
  2> include failureType and set it to scg-ChangeFailure;
1> else if the UE initiates transmission of the SCGFailureInformation message due to exceeding maximum uplink transmission timing difference:
  2> include failureType and set it to maxUL-TimingDiff;
1> set the measResultServFreqList to include for each SCG cell that is configured, if any, within measResultSCell the quantities of the concerned SCell, if available according to performance requirements;
1> for each SCG serving frequency included in measResultServFreqList, include within measResultBestNeighCell the physCellId and the quantities of the best non-serving cell, based on RSRP, on the concerned serving frequency;
1> set the measResultNeighCells to include the best measured cells on non-serving E-UTRA frequencies, ordered such that the best cell is listed first, and based on measurements collected up to the moment the UE detected the failure, and set its fields as follows;
  2> if the UE was configured to perform measurements for one or more non-serving EUTRA frequencies and measurement results are available, include the measResultListEUTRA;
  2> for each neighbour cell included, include the optional fields that are available;

The UE shall submit the SCGFailureInformation message to lower layers for transmission.

2. Embodiment 2

According to another embodiment of the present invention, if the UE receives an SCG configuration which cannot be complied by the UE, the UE selectively transmits an SCG failure information message to either MN or SN according to from which network node the SCG configuration has been received or through which SRB type the SCG configuration has been received. The network node may be any one of MeNB, MgNB, SeNB, and SgNB. The SRB type may be any one of the MCG SRB, SG SRB, or split SRB. In other words, if the UE receives an SCG configuration which cannot be complied by the UE from the MN through the MCG SRB or MCG transmission of a split SRB, the UE may transmit the SCG failure information message to the MN. Similarly, if the UE receives an SCG configuration which cannot be complied by the UE from the SN through the SCG SRB or SCG transmission of a split SRB, the UE may transmit the SCG failure information message to the SN.

Figure 11:
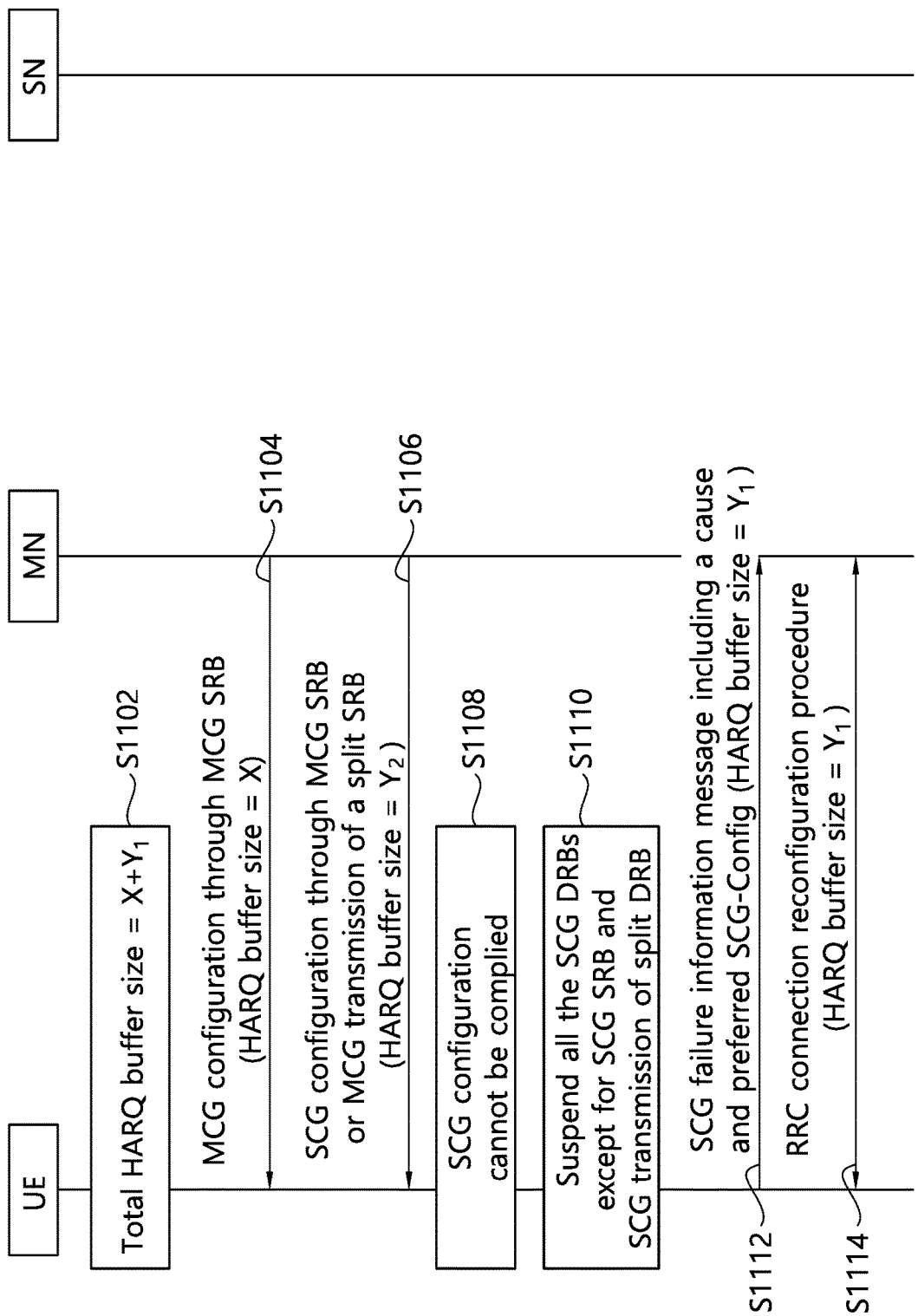
FIG. 11 shows an example of a method for transmitting an SCG failure information message according to embodiment 2 of the present invention.

FIG. 11 shows an example of a method for transmitting an SCG failure information message according to embodiment 2 of the present invention. FIG. 11 assumes that an SCG configuration is received from MN through an MCG SRB or MCG transmission of a split SRB.

In step S1102, the UE sets the total size of the HARQ buffer to $X+Y_1$. In step S1104, the UE receives an MCG configuration from the MN through the MCG SRB. The MCG configuration includes information indicating that the HARQ buffer size for the MN is X.

In step S1106, the UE receives an SCG configuration from MN through the MCG SRB or MCG transmission of a split SRB. The SCG configuration includes information indicating that the size of the HARQ buffer for the SN is $Y_2$, which is larger than $Y_1$.

In step S1108, the UE cannot comply with the SCG configuration. Therefore, the UE detects a failure related to the SCG. In step S1110, the UE may suspend all SCG DRBs and SCG transmission for split DRBs except SCG SRB.

In step S1112, the UE transmits the SCG failure information message to the MN through the MCG SRB or MCG transmission of the split SRB. Since the SCG configuration is received from the MN through the MCG SRB or MCG transmission of the split SRB, the SCG failure information message is also transmitted to the MN through the MCG SRB or MCG transmission of the split SRB. The SCG failure information message may include a cause of the failure related to the SCG and/or preferred SCG configuration (namely, the HARQ buffer size for $SN=Y_1$).

In step S1114, the UE and MN perform SCG reconfiguration through an RRC connection reconfiguration procedure. The SCG reconfiguration may include information indicating that the HARQ buffer size for the SN is $Y_1$.

Figure 12:
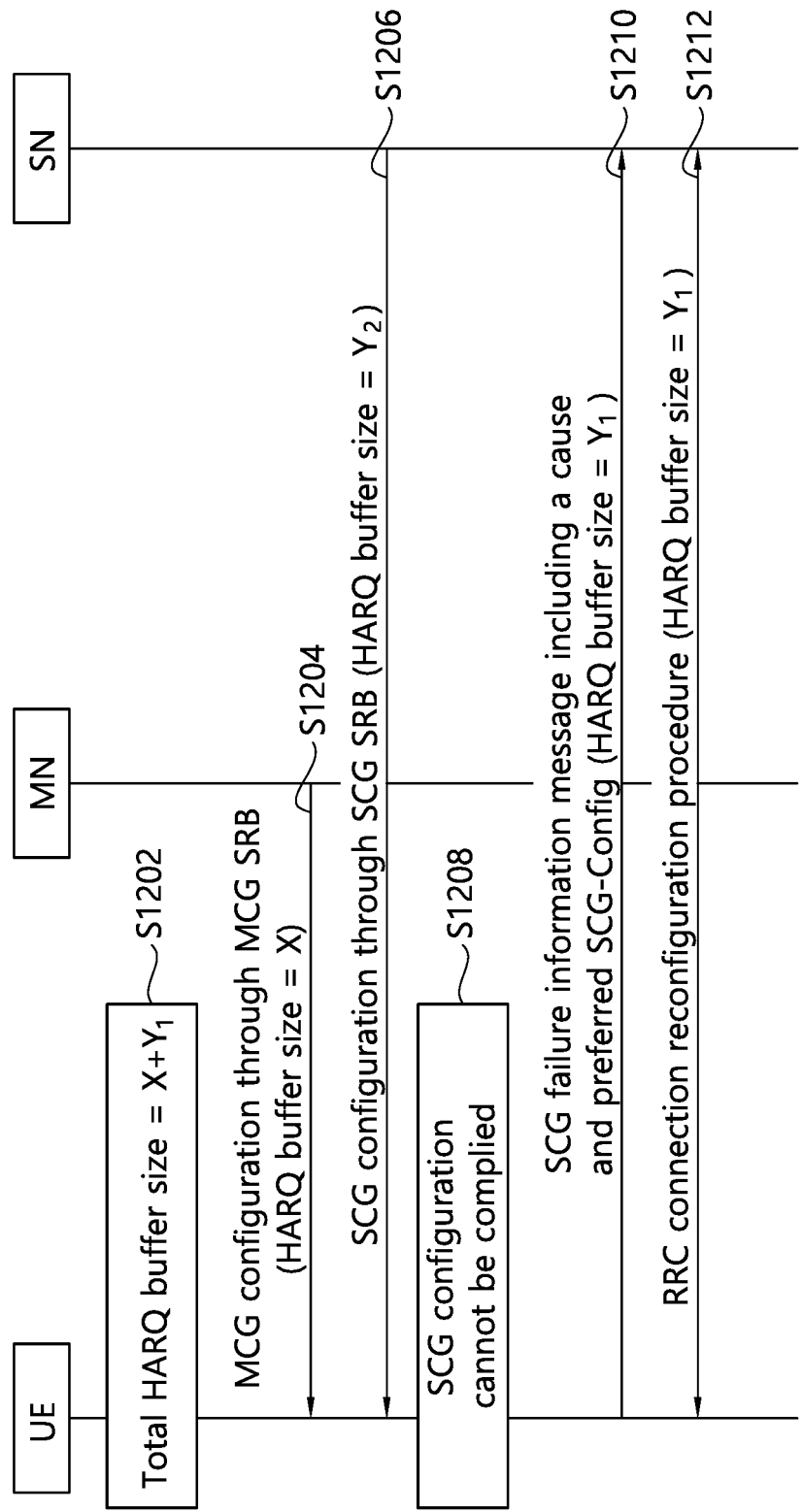
FIG. 12 shows another example of a method for transmitting an SCG failure information message according to embodiment 2 of the present invention.

FIG. 12 shows another example of a method for transmitting an SCG failure information message according to embodiment 2 of the present invention. FIG. 12 assumes that an SCG configuration is received from SN through an SCG SRB or SCG transmission of a split SRB.

In step S1202, the UE sets the total size of the HARQ buffer to $X+Y_1$. In step S1104 step, the UE receives an MCG configuration from the MN through the MCG SRB. The MCG configuration includes information indicating that the HARQ buffer size for the MN is X.

In step S1206, the UE receives an SCG configuration from SN through the SCG SRB or SCG transmission of a split SRB. The SCG configuration includes information indicating that the size of the HARQ buffer for the SN is $Y_2$, which is larger than $Y_1$.

In step S1208, the UE is unable to accept the SCG configuration. Therefore, the UE detects a failure related to the SCG. The UE may suspend all SCG DRBs and SCG transmission for split DRBs except SCG SRB.

In step S1210, the UE transmits the SCG failure information message to the SN through the SCG SRB or SCG transmission of the split SRB. Since the SCG configuration is received from the SN through the SCG SRB or SCG transmission of the split SRB, the SCG failure information message is also transmitted to the SN through the SCG SRB or SCG transmission of the split SRB. The SCG failure information message may include a cause of the failure related to the SCG and/or preferred SCG configuration (namely, the HARQ buffer size for $SN=Y_1$).

In step S1212, the UE and SN perform SCG reconfiguration through an RRC connection reconfiguration procedure. The SCG reconfiguration may include information indicating that the HARQ buffer size for the SN is Y1.

According to embodiment 2 of the present invention, the conventional procedure for transmitting an SCG failure information message may be modified as follows. A UE initiates the procedure to report SCG failures when SCG transmission is not suspended and when one of the following conditions is met.
  1> upon detecting radio link failure for the SCG; or
  1> upon SCG change failure; or
  1> upon stopping uplink transmission towards the PSCell due to exceeding the maximum UL transmission timing difference when powerControlMode is configured to 1.
  1> upon receiving SCG configuration which UE cannot comply with.

Upon initiating the procedure, the UE shall:
1> if the UE receives the not complied SCG configuration:
2> suspend all SCG DRBs and suspend SCG transmission for split DRBs except SCG SRB;
1> else:
2> reset SCG-MAC;
2> stop T307;
2> initiate transmission of the SCGFailureInformation message;
The UE shall set the contents of the SCGFailureInformation message as follows:
1> if the UE initiates transmission of the SCGFailureInformation message over MCG SRB to provide SCG radio link failure information:
2> include failureType and set it to the trigger for detecting SCG radio link failure;
1> else if the UE initiates transmission of the SCGFailureInformation message over SCG SRB or split SRB to provide preferred SCG configuration (e.g., HARQ buffer size):
2> include failureType and set it to SCG configuration Failure;
1> else if the UE initiates transmission of the SCGFailureInformation message to provide SCG change failure information:
2> include failureType and set it to scg-ChangeFailure;
1> else if the UE initiates transmission of the SCGFailureInformation message due to exceeding maximum uplink transmission timing difference:
2> include failureType and set it to maxUL-TimingDiff;
1> set the measResultServFreqList to include for each SCG cell that is configured, if any, within measResultSCell the quantities of the concerned SCell, if available according to performance requirements;
1> for each SCG serving frequency included in measResultServFreqList, include within measResultBestNeighCell the physCellId and the quantities of the best non-serving cell, based on RSRP, on the concerned serving frequency;
1> set the measResultNeighCells to include the best measured cells on non-serving E-UTRA frequencies, ordered such that the best cell is listed first, and based on measurements collected up to the moment the UE detected the failure, and set its fields as follows;
2> if the UE was configured to perform measurements for one or more non-serving EUTRA frequencies and measurement results are available, include the measResultListEUTRA;
2> for each neighbor cell included, include the optional fields that are available;
The UE shall submit the SCGFailureInformation message to lower layers for transmission.

Figure 13:
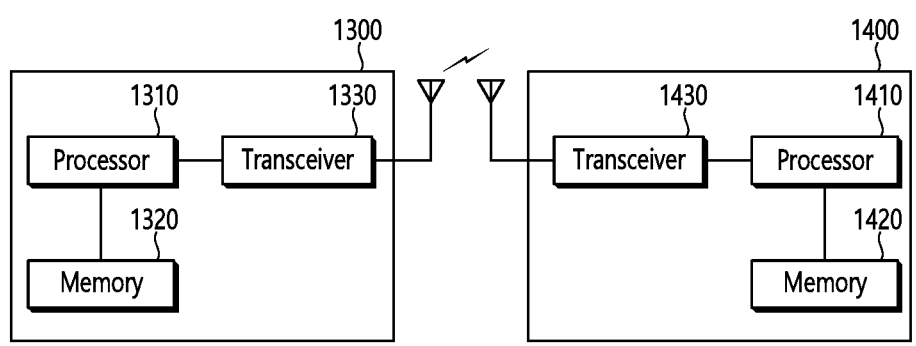
FIG. 13 shows a wireless communication system in which an embodiment of the present invention is implemented.

FIG. 13 shows a wireless communication system in which an embodiment of the present invention is implemented.

The UE 1300 includes a processor 1310, a memory 1320, and a transceiver 1330. The memory 1320, being connected to the processor 1310, stores various pieces of information for operating the processor 1310. The transceiver 1330, being connected to the processor 1310, may transmit a wireless signal to a network node 1400 or receives a wireless signal from the network node 1400.

The processor 1310 may be configured to implement proposed functions, processes and/or methods described in the present specification. More specifically, the processor 1310 may control the transceiver 1330 to perform the steps S902 and/or S904 of FIG. 9. The processor 1310 may perform the steps S1002 to S1012 of FIG. 10 or may control the transceiver 1330 for this purpose. The processor 1310 may perform the steps S1102 to S1112 of FIG. 11 or may control the transceiver 1330 for this purpose. The processor 1310 may perform the steps S1202 to S1212 of FIG. 12 or may control the transceiver 1330 for this purpose.

The network node 1400 includes a processor 1410, a memory 1420, and a transceiver 1430. The network node 1400 may correspond to any one of eNB, gNB, ng-eNB, and en-gNB. The network node 1400 may be either MN or SN described above. The memory 1420, being connected to the processor 1410, stores various pieces of information for operating the processor 1410. The transceiver 1430, being connected to the processor 1410, transmits a wireless signal to the UE 1300 or receives a wireless signal from the UE 1300.

The processor 1310, 1410 may include application-specific integrated circuit (ASIC), other chipset, logical circuit and/or data processing device. The memory 1320, 1420 may include read-only memory (ROM), random access memory (RAM), flash memory, memory card, storage medium and/or other storage device. The transceiver 1330, 1430 may include a baseband circuit for processing a radio frequency signal. When an embodiment is implemented by software, the aforementioned method may be implemented by a module (process or function) which performs the aforementioned function. A module may be stored in the memory 1320, 1420 and executed by the processor 1310, 1410. The memory 1320, 1420 may be installed inside or outside the processor 1310, 1410 and may be connected to the processor 1310, 1410 via various well-known means.

Figure 14:
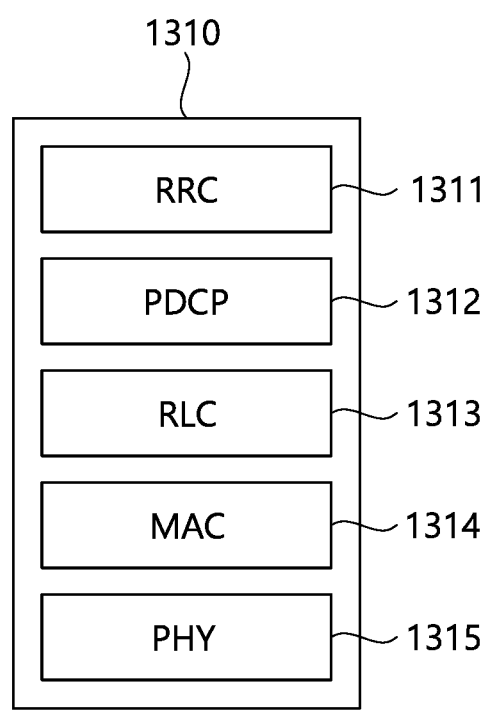
FIG. 14 shows a processor of the UE of FIG. 13.

FIG. 14 shows a processor of the UE of FIG. 13. The RRC layer 1311, PDCP layer 1312, RLC layer 1313, MAC layer 1314, and physical layer 1315 may be implemented by the processor 1310. The RRC layer 1311 may be configured to implement the function, process and/or method of the processor 1310.

Figure 15:
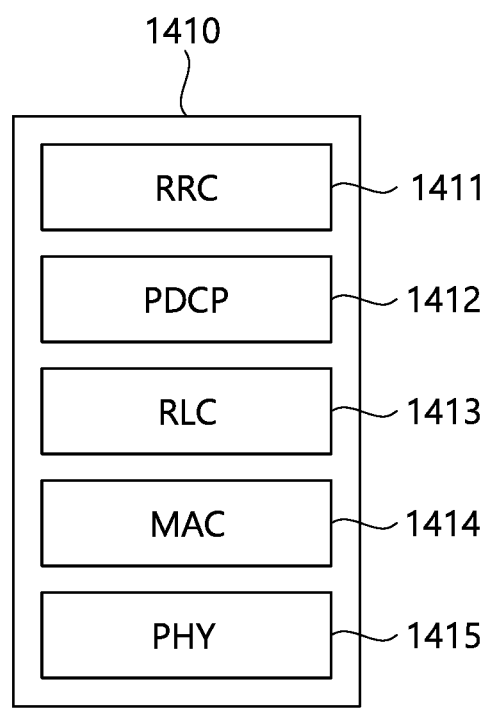
FIG. 15 shows a processor of the network node of FIG. 13.

FIG. 15 shows a processor of the network node of FIG. 13. The RRC layer 1411, PDCP layer 1412, RLC layer 1413, MAC layer 1414, and physical layer 1415 may be implemented by the processor 1410. The RRC layer 1411 may be configured to implement the function, process and/or method of the processor 1410.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for transmitting a secondary cell group (SCG) failure information message by a user equipment (UE) in a wireless communication system, the method comprising:
   detecting a failure related to a SCG; and
   transmitting the SCG failure information message to either a master node (MN) or a secondary node (SN) according to a cause of the failure related to the SCG, wherein the failure related to the SCG is detected by receiving an SCG configuration which cannot be complied by the UE, and wherein the SCG configuration which cannot be complied by the UE is received through any one of a master cell group (MCG) signaling radio bearer (SRB), an SCG SRB, or a split SRB.

2. The method of claim 1, wherein the SCG failure information message is transmitted to the SN based on the cause of the failure related to the SCG being associated with a hybrid automatic repeat request (HARQ) buffer size.

3. The method of claim 1, wherein the SCG failure information message is transmitted to the MN based on the cause of the failure related to the SCG being not associated with a HARQ buffer size.

4. The method of claim 1, wherein the SCG failure information message includes the cause of the failure related to the SCG.

5. The method of claim 1, wherein the SCG failure information message includes a SCG configuration preferred by the UE.

6. The method of claim 1, wherein the SCG configuration which cannot be complied by the UE is received from at least one of the MN or SN.

7. The method of claim 1, further comprising suspending all SCG data radio bearers (DRBs) and suspend SCG transmission for split DRBs except an SCG SRB.

8. The method of claim 1, wherein the MN is either an eNodeB (eNB) of a long-term evolution (LTE) or gNB of a new radio access technology (NR), and wherein the SN is either the eNB of the LTE or gNB of NR.

9. The method of claim 1, wherein the UE is in communication with at least one of a mobile device, a network, and/or autonomous vehicles other than the UE.

10. A user equipment (UE) in a wireless communication system, comprising:

a memory;

a transceiver; and a processor connected to the memory and the transceiver, wherein the processor is configured to:

detect a failure related to a SCG, and control the transceiver to transmit the SCG failure information message to either a master node (MN) or a secondary node (SN) according to a cause of the failure related to the SCG, wherein the failure related to the SCG is detected by receiving an SCG configuration which cannot be complied by the UE, and wherein the SCG configuration which cannot be complied by the UE is received through any one of a master cell group (MCG) signaling radio bearer (SRB), an SCG SRB, or a split SRB.

11. The UE of claim 10, wherein the SCG failure information message is transmitted to the SN based on the cause of the failure related to the SCG being associated with a hybrid automatic repeat request (HARQ) buffer size.

12. The UE of claim 10, wherein the SCG failure information message is transmitted to the MN based on the cause of the failure related to the SCG being not associated with a HARQ buffer size.

13. The UE of claim 10, wherein the SCG failure information message includes the cause of the failure related to the SCG.

14. The UE of claim 10, wherein the SCG failure information message includes a SCG configuration preferred by the UE.

* * * * *